United States Patent [19]

Sato

[11] Patent Number: 4,604,420
[45] Date of Patent: * Aug. 5, 1986

[54] VULCANIZABLE POLYMER COMPOSITIONS WITH IMPROVED SCORCH

[75] Inventor: Kyosaku Sato, Sarnia, Canada

[73] Assignee: Polysar Limited, Sarnia, Canada

[ * ] Notice: The portion of the term of this patent subsequent to Jul. 2, 2002 has been disclaimed.

[21] Appl. No.: 714,919

[22] Filed: Mar. 22, 1985

[51] Int. Cl.$^4$ ................................. C08F 8/42
[52] U.S. Cl. ................................. 524/394; 524/556; 524/559; 525/330.2; 525/362; 525/363
[58] Field of Search ............ 524/394; 525/330.2, 525/362, 363

[56] References Cited

U.S. PATENT DOCUMENTS

| | | | |
|---|---|---|---|
| 2,075,251 | 3/1937 | Winkelmann | 524/394 |
| 2,368,522 | 1/1945 | Cornell et al. | 524/394 |
| 2,459,874 | 1/1949 | Fay, Jr. | 524/394 |
| 2,849,426 | 8/1958 | Miller | 525/329.3 |
| 3,403,136 | 9/1968 | Baker, Jr. | 525/329.3 |
| 4,179,421 | 12/1979 | Edwards et al. | 524/394 |

FOREIGN PATENT DOCUMENTS

| | | |
|---|---|---|
| 725070 | 1/1966 | Canada . |
| 948709 | 2/1964 | United Kingdom . |

Primary Examiner—Joseph L. Schofer
Assistant Examiner—Bernard Lipman
Attorney, Agent, or Firm—Stevens, Davis, Miller & Mosher

[57] ABSTRACT

Vulcanizable polymer compositions with improved scorch are provided comprising a carboxylated nitrile rubber or a carboxylated styrene-butadiene rubber, one or more polyvalent metal oxides and one or more alkali metal salts selected from the lithium, sodium and potassium salts of $C_{12-18}$-alkanoic acids.

16 Claims, No Drawings

VULCANIZABLE POLYMER COMPOSITIONS WITH IMPROVED SCORCH

FIELD OF THE INVENTION

This invention relates to vulcanizable polymer compositions with improved scorch comprising a carboxylated rubber, one or more polyvalent metal oxides and one or more alkali metal salts selected from the lithium, sodium and potassium salts of $C_{12-18}$-alkanoic acids. The carboxylated rubber is selected from carboxylated styrene-butadiene rubber (carboxylated SBR) and carboxylated nitrile rubber.

DESCRIPTION OF THE PRIOR ART

Polyvalent metal oxide vulcanization of carboxylated nitrile rubber (i.e. a copolymer of butadiene, acrylonitrile and one or more $\alpha,\beta$-unsaturated carboxylic acids) or carboxylated SBR (a copolymer of butadiene, styrene, and one or more $\alpha,\beta$-unsaturated carboxylic acids) is well known in the art. The metal oxide used in the vulcanization of said carboxylated rubbers may be used alone or in combination with sulfur and in this latter case, the metal oxide is usually referred to as an activator. In both cases, vulcanization by the metal oxide occurs by the formation of ionic crosslinks resulting from the condensation reaction of the carboxyl group in the polymer with the polyvalent metal oxide. This reaction is very rapid in any polymer composition comprising an intimate mixture of one of said carboxylated rubbers and a polyvalent metal oxide. Such compositions may gradually or suddenly become tough and unworkable during compounding or while standing at ordinary room temperatures. This premature vulcanization is usually referred to as scorch and is a significant problem for the industry.

Various methods have been developed in the art in an attempt to improve the scorch of vulcanizable polymer compositions comprising a carboxylated rubber and a polyvalent metal oxide. Ideally, such compositions should not undergo premature vulcanization or scorching at room temperatures so that they may be stored until used. They should also be capable of being compounded without scorching at temperatures below the vulcanization temperature of the compositions and upon vulcanization, such compositions should not show any undesirable vulcanizate properties.

U.S. Pat. No. 3,248,360 teaches a rubbery composition having the ability to be stored and processed at normal temperatures without premature curing comprising a rubbery polymer, such as a carboxylated SBR or carboxylated nitrile rubber, and a polyvalent metal compound, such as polyvalent metal oxide, which is completely coated with a phosphate of the same polyvalent metal. U.S. Pat. No. 3,258,448 teaches a similar composition wherein the polyvalent metal compound is completely coated with a sulfide or mercaptide of the same polyvalent metal. Both of these methods are undesirable because they require the preparation of the coated polyvalent metal compounds thereby increasing the cost to the rubber compounder.

The prior art also discloses a number of additives which improve the scorch of vulcanizable polymer compositions comprising a carboxylated rubber and a polyvalent metal oxide. U.S. Pat. No. 3,178,389 teaches the use of a polyvalent metal alcoholate. U.S. Pat. No. 4,415,690 teaches the use of a $C_{8-25}$-alkyl or -alkenyl derivative of succinic acid or anhydride. Brown in Rubber Chemistry and Technology, Vol. 36, pp. 931-62 (1963) teaches the use of a number of additives including carboxylic acids such as stearic acid; organic acid anhydrides such as succinic and phthalic anhydride; silica; and boric acid. Many of these prior art additives have been shown to improve the scorch of such polymer compositions only slightly or not at all.

Zakharov and Shadricheva in Rubber Chemistry and Technology, Vol. 36, pp. 575-79 (1963) teach the use of 45 parts by weight of magnesium stearate per 100 parts by weight of rubber to improve the scorch of a vulcanizable polymer composition comprising a carboxylated styrene-butadiene rubber and zinc oxide.

It is an object of the present invention to provide a vulcanizable polymer composition with improved scorch comprising a carboxylated SBR or carboxylated nitrile rubber and one or more polyvalent metal oxides.

It is a further object of the present invention to provide a method for preparing a vulcanizable polymer composition with improved scorch comprising a carboxylated SBR or carboxylated nitrile rubber and one or more polyvalent metal oxides.

SUMMARY OF THE INVENTION

Accordingly, the present invention provides a vulcanizable polymer composition with improved scorch comprising a carboxylated SBR or carboxylated nitrile rubber, one or more polyvalent metal oxides, and one or more alkali metal salts selected from the lithium, sodium and potassium salts of $C_{12-18}$-alkanoic acids.

The present invention further provides a method for preparing a vulcanizable polymer composition with improved scorch comprising mixing a carboxylated SBR or carboxylated nitrile rubber with one or more alkali metal salts selected from the lithium, sodium and potassium salts of $C_{12-18}$-alkanoic acids and with one or more polyvalent metal oxides.

DETAILED DESCRIPTION

The carboxylated SBR and carboxylated nitrile rubbers used in the present invention may be any of those known in the art.

The carboxylated nitriles are copolymers of butadiene, acrylonitrile and one or more $\alpha,\beta$-unsaturated carboxylic acids. The carboxylic acids may contain one or more carboxylic groups. Because of cost and availability, it is preferred that the carboxylic acids be selected from acrylic, methacrylic, fumaric, maleic and itaconic acids. The copolymers may be prepared by the well known emulsion free radical process. The carboxylated nitrile may have an acrylonitrile content from about 20 to about 40 percent by weight of the copolymer. The total content of carboxylic acid in the copolymer may be from about 0.5 to about 10 percent by weight of the copolymer. Butadiene forms the balance to 100 percent by weight of the copolymer. The viscosity of the copolymer is generaly within the Mooney range (ML 1+4 at 100° C.) of from about 40 to about 80.

The carboxylated SBRs are copolymers of styrene, butadiene and one or more $\alpha,\beta$-unsaturated carboxylic acids. The carboxylic acids may contain one or more carboxylic groups. Because of cost and availability, it is preferred that the carboxylic acids be selected from acrylic, methacrylic, fumaric, maleic and itaconic acids. The copolymers may be prepared by the well known free radical emulsion process. The carboxylated SBR may have a styrene content of from about 15 to about 40 percent by weight of the polymer. The total content of carboxylic acid may be from about 0.5 to 10 percent by weight of the polymer. Butadiene forms the balance to 100 percent by weight of the polymer. The viscosity of the copolymer is generally within the Mooney range (ML 1+4 at 100° C.) of from about 40 to about 80.

The vulcanization system for the vulcanizable polymer compositions of the present invention may be a polyvalent metal oxide system, a polyvalent metal oxide activated sulfur system or a polyvalent metal oxide-organic peroxide system. In a polyvalent metal oxide system any of the polyvalent metal oxides known in the art may be used. These include the oxides of zinc, magnesium, calcium, cadmium, barium, lead, cobalt, tin, strontium and mixtures thereof. The use of zinc oxide is preferred. Conventional amounts of the oxide are used, generally from about one-half to about two times the stoichiometric or theoretical amount based on the carboxylic acid content of the rubber in the polymer composition.

In the case of an activated sulfur vulcanization system, the metal oxides are used in combination with elemental sulfur and conventional sulfur accelerators such as tetramethyl thiuram monosulfide or disulfide. The metal oxides are generally limited to zinc, magnesium, calcium and barium oxides and mixtures thereof and are used in amounts which are generally from about 2 to about 6 parts by weight of total oxides per 100 parts by weight of rubber in the polymer composition. The use of zinc oxide is preferred. The amount of elemental sulfur used is generally from about 0.1 to about 2 parts by weight and the total amount of accelerators is generally from about 0.2 to about 6 parts by weight, both based on 100 parts by weight of rubber in the polymer composition.

In the case of a metal oxide-organic peroxide system, any of the polyvalent metal oxides known in the art may be used in amounts of from about 1 to about 5 parts by weight per 100 parts by weight of rubber in the polymer composition. Any of the conventional organic peroxides may be used in amounts of from about 0.2 to about 5 parts by weight of pure peroxide per 100 parts by weight of rubber.

The alkali metal salts of $C_{12-18}$-alkanoic acids, which may be used in the present invention are selected from the lithium, sodium and potassium salts of these acids. It is preferred to use the sodium and potassium salts of these acids. Sodium and potassium stearate are most preferred. Sufficient amounts of the salts should be used to improve the scorch of the vulcanizable polymer composition. It is preferred to use from about 0.5 to about 25 parts by weight of the salts per 100 parts by weight of carboxylated rubber in the polymer composition, more preferably from about 0.5 to about 10, and most preferably from about 2 to about 5 parts by weight.

The vulcanizable polymer compositions of the present invention may additionally comprise other conventional additives such as antioxidants, fillers such as carbon black, plasticizers such as dioctyl phthalate, oil, and activating agents such as stearic acid.

In the method of the present invention, the vulcanizable polymer composition is prepared by mixing a carboxylated SBR or a carboxylated nitrile rubber with one or more of the aforesaid alkali metal salts and with one or more polyvalent metal oxides. Mixing may be carried out by any conventional dry rubber mixing technique using, for example, a rubber mill, or an internal mixer such as a Brabender ® mixer or a Banbury ® mixer. The conventional mixing sequences for metal oxide vulcanization systems or for metal oxide activated sulfur vulcanization systems may be used.

For a metal oxide vulcanization system, all of the ingredients may be mixed in a single step if precautions are taken to keep the temperature of the mixture relatively low. For example, a cool rubber mill with the roll temperature at about 30°–35° C. may be used with the temperature of the mixture being kept below about 60° C. However, it is preferred to mix all of the ingredients except the metal oxide in a first step and then mix the metal oxide in a second step at relatively low temperatures, for example on a cool rubber mill. Further, it is preferred that the mixture from the first step be heat treated prior to mixing the metal oxide; i.e. the mixture should be heated at from about 85° to about 175° C. while being mixed, preferably from about 100° to about 160° C. This may be accomplished during the mixing of the first step or subsequent to it using, for example, a rubber mill with the rolls at an elevated temperature or an internal mixer, e.g. a Brabender or Banbury, with the mixing chamber maintained at an elevated temperature. Heat treatment is preferred because it provides vulcanizable polymer compositions according to the present invention with scorch superior to that of the same compositions which are not heat treated.

For a metal oxide activated sulfur vulcanization system, the sulfur and any sulfur accelerators may be mixed in a single step with the other ingredients at relatively low temperatures as above. Again, it is preferred to use separate mixing steps with heat treatment prior to the mixing of the metal oxide, sulfur and sulfur accelerators. The sulfur and sulfur accelerators may be mixed with the metal oxide during the second step, or in a separate third step.

The vulcanizable polymer compositions of the present invention may be heated to form vulcanizates using conventional procedures well known in the art. Suitable temperatures are from about 135° C. to about 200° C., preferably from about 150° C. to about 170° C., for periods of from about 2 minutes to about 10 hours, preferably from about 5 to about 45 minutes.

These vulcanizable polymer compositions are particularly useful in the preparation of articles requiring moderately long processing and/or shaping operations such as, for example, belting, hoses, tubing, seals and gaskets.

The folliwng examples illustrate the present invention but are not intended to be limiting.

EXAMPLE 1

In this and the examples which follow, the carboxylated nitrile rubber (XNBR) used had a Mooney viscosity (ML 1+4 at 100° C.) of about 50 and contained about 29 percent acrylonitrile and about 7 percent of a carboxylic acid monomer. Mooney scorch values were determined according to ASTM D 1646 at an operating temperature of 125° C. The times taken for a 5 point rise in Mooney viscosity, usually called the $t_5$ time, are reported.

Compounds were produced by mixing the ingredients shown in Table 1 until the mixtures were homogeneous, using a cool rubber mill and keeping the temperature of the mixtures below about 60° C. The compounds so produced were then sheeted off and tested for scorch. Runs 1 through 4 illustrate the present invention while run 5 is comparative. Vulcanizable polymer compositions of the present invention have superior scorch compared to the control.

TABLE 1

| Ingredients (parts by weight) | Run | | | | |
|---|---|---|---|---|---|
| | 1 | 2 | 3 | 4 | 5 |
| XNBR | 100 | 100 | 100 | 100 | 100 |
| Carbon Black (type N660) | 50 | 50 | 50 | 50 | 50 |
| Stearic Acid | 1 | 1 | 1 | 1 | 1 |
| Potassium Stearate | 1 | 2 | 3 | 4 | — |
| Zinc oxide | 5 | 5 | 5 | 5 | 5 |
| Scorch (minutes) | 8 | 10 | 11 | 13 | 5 |

EXAMPLE 2

Compounds were produced by mixing the ingredients shown in Table 2. All of the ingredients except the zinc oxide were initially mixed using a cool rubber mill as in Example 1. Once homogeneous mixtures were obtained, the roll temperature was increased to about 100° C. and mixing was continued for about 3 minutes in order to provide heat treatment to the mixtures. The roll temperatures was then decreased to about 35° C. and the zinc oxide mixed until homogeneous compounds were obtained whereupon the compounds were sheeted off and tested for scorch. Run 1 illustrates the present invention while Run 2 is comparative. The scorch of the vulcanizable polymer composition of the present invention is clearly superior to that of the control.

TABLE 2

| Ingredients (parts by weight) | Run | |
|---|---|---|
| | 1 | 2 |
| XNBR | 100 | 100 |
| Carbon Black (type N660) | 50 | 50 |
| Potassium Stearate | 5 | — |
| Zinc oxide | 5 | 5 |
| Scorch (minutes) | 30 | 11 |

EXAMPLE 3

Compounds were produced by mixing the ingredients shown in Table 3. The ingredients of step 1 were thoroughly mixed in a Brabender mixer at 100 rpm with the head temperature at about 100° C. and then heat treated by continued mixing in the Brabender for about 3 minutes with the head temperature at about 100° C. The maximum temperatures reached in the mixing chamber are shown in the Table. The mixtures were transferred to a cool rubber mill and mixed with the zinc oxide in step 2, keeping the mixture temperature below about 60° C., until homogeneous. Samples were obtained for measuring scorch. The remainders of the mixtures were further mixed on the cool mill as before with the ingredients of step 3 and again tested for scorch. Runs 1 through 4 illustrate the present invention while run 5 is comparative. The scorch of the vulcanizable polymer compositions of the present invention is superior to that of the control for both the metal oxide vulcanization system (scorch measured after step 2) and the metal oxide activated sulfur vulcanization system (scorch measured after step 3).

TABLE 3

| Ingredients (parts by weight) | Run | | | | |
|---|---|---|---|---|---|
| | 1 | 2 | 3 | 4 | 5 |
| Step 1 | | | | | |
| XNBR | 100 | 100 | 100 | 100 | 100 |
| Carbon Black (type N660) | 50 | 50 | 50 | 50 | 50 |
| Stearic Acid | 1 | 1 | 1 | 1 | 1 |
| Potassium Stearate | 1 | 2 | 3 | 4 | — |
| Maximum Chamber Temperature (°C.) | 131 | 130 | 131 | 132 | 142 |
| Step 2 | | | | | |
| Zinc oxide | 5 | 5 | 5 | 5 | 5 |
| Scorch (minutes) | 9 | 11 | 15 | 18 | 7 |
| Step 3 | | | | | |
| Sulfur | 1.5 | 1.5 | 1.5 | 1.5 | 1.5 |
| Tetramethyl thiuram monosulfide | 1.5 | 1.5 | 1.5 | 1.5 | 1.5 |
| Scorch (minutes) | 7 | 9 | 10 | 10 | 4 |

EXAMPLE 4

This example compares the scorch of vulcanizable polymer compositions of the present invention using a zinc oxide vulcanization system with that of a similar composition using a zinc peroxide vulcanization system. The ingredients shown in Table 4 were mixed as described for steps 1 and 2 in Example 3. The resulting mixtures were sheeted off and tested for scorch. The zinc peroxide used in this and the examples which follow was a latex dispersed masterbatch of about 50 parts by weight zinc peroxide in about 50 parts by weight of a medium acrylonitrile content nitrile rubber sold under the trade name KRYNAC PA50 by Polysar Limited (KRYNAC is a registered trademark). The scorch of the vulcanizable polymer compositions according to the present invention (Runs 1 and 2) is superior to that of the comparative composition (Run 3).

TABLE 4

| Ingredients (parts by weight) | Run | | |
|---|---|---|---|
| | 1 | 2 | 3 |
| Step 1 | | | |
| XNBR | 100 | 100 | 90 |
| Carbon Black (type N660) | 50 | 50 | 50 |
| Stearic Acid | 1 | — | — |
| Potassium Stearate | 5 | 5 | — |
| Maximum Chamber Temperature (°C.) | 133 | 138 | 148 |
| Step 2 | | | |
| Zinc oxide | 5 | 5 | — |
| KRYNAC PA50 | — | — | 20 |
| Scorch (minutes) | 21 | 24 | 13 |

EXAMPLE 5

This example compares the scorch of a number of compounds produced by mixing the ingredients shown in Table 5. The ingredients of step 1 were thoroughly mixed on a cool rubber mill keeping the temperature of the mixtures below about 60° C. The resulting mixtures were transferred to a Brabender and heat treated by mixing for 3 minutes with the head temperature at about 100° C. The mixtures reached a maximum temperature of 125°–142° C. The ingredients of step 2 were then mixed with the heat treated mixture on a cool rubber mill as in the first step and the resulting compounds sheeted off and tested for scorch. Some duplicate runs were carried out omitting the heat treatment step in the Brabender (Runs 1, 2, 4, 5, 6, 9, 13 and 14 only).

Run 1 is comparative, the polymer composition having a zinc peroxide curing system as in Example 4, Run 3. Runs 2 and 3 are comparative and contain no additive to improve the scorch of the compositions. Runs 4 to 8 are comparative using polyvalent metal salts of alkanoic acids. Runs 9 to 12 are comparative using various other prior art scorch retardant additives. Runs 13 to 15 illustrate the present invention using sodium and potassium stearate.

TABLE 5

| Ingredients (parts by weight) | Run 1 | Run 2 and 3 | Run 3 to 18 |
|---|---|---|---|
| Step 1 | | | |
| XNBR | 95 | 100 | 100 |
| Carbon Black (type N660) | 50 | 50 | 50 |
| Dioctyl phthalate | 5 | 5 | 5 |
| Compound A (See Table 6) | — | — | various |
| Step 2 | | | |
| Zinc oxide | — | 5 | 5 |
| KRYNAC PA50 | 10 | — | — |

TABLE 6

| Run | Compound A Identity | Parts by Wt. | Scorch (minutes) With Heat Treatment | Scorch (minutes) Without Heat Treatment |
|---|---|---|---|---|
| 1 | None | — | 26 | 16 |
| 2 | None | — | 12 | 6 |
| 3 | None | — | 14 | — |
| 4 | Calcium stearate | 3.20 | 10 | 6 |
| 5 | Zinc stearate | 3.33 | 8.5 | 6 |
| 6 | Aluminum stearate | 3.08 | 10 | 6 |
| 7 | Magnesium stearate | 2.89 | 9 | — |
| 8 | Barium stearate | 3.44 | 14 | — |
| 9 | Stearic acid | 3.00 | 8 | 5 |
| 10 | Stearic acid | 1.00 | 12 | — |
| 11 | Succinic acid | 1.16 | 9 | — |
| 12 | Succinic anhydride | 0.98 | 3 | — |
| 13 | Sodium stearate | 3.23 | 25 | 13 |
| 14 | Potassium stearate | 3.40 | 16 | 9 |
| 15 | Sodium stearate | 3.00 | 29 | — |

EXAMPLE 6

This example illustrates the effects of temperature and length of time used in the heat treatment step. The compound of Example 5, Run 13 was used throughout. The ingredients were mixed with heat treatment as in Example 5. Table 7 shows the effects on scorch of heat treatment for 3 minutes in a Brabender with various initial head temperatures. Table 8 shows the effect of various lengths of times used at constant head temperature. While Example 5 showed that heat treatment produces a definite improvement in scorch, this example shows that neither the length of time that it is applied nor the initial head temperature of the internal mixer is important. As long as the compound temperature reaches from about 85° to about 175° C. during mixing, heat treatment will occur and provide an improvement in scorch.

TABLE 7

| | Run 1 | Run 2 | Run 3 | Run 4 |
|---|---|---|---|---|
| Initial head temperature (°C.) | 14 | 61 | 81 | 120 |
| Maximum chamber temperature (°C.) | 84 | 110 | 119 | 134 |
| Scorch (minutes) | 19 | 22 | 22 | 22 |

TABLE 8

| | Run 1 | Run 2 | Run 3 | Run 4 | Run 5 |
|---|---|---|---|---|---|
| Heat Treatment time (minutes) | 1 | 2 | 5 | 7 | 10 |
| Head temperature (°C.) | 100 | 99 | 99 | 99 | 101 |
| Maximum chamber temperature (°C.) | 108 | 116 | 126 | 130 | 134 |
| Scorch (minutes) | 21.5 | 21 | 23 | 21 | 21 |

EXAMPLE 7

This example illustrates the present invention and demonstrates the effects on scorch of the amount of sodium stearate used in the compounds. The ingredients shown in Table 9 were mixed with heat treatment as in Example 5. Run 1 is comparative.

TABLE 9

| Ingredients (parts by weight) | 1 | 2 | 3 | 4 | 5 | 6 | 7 | 8 | 9 |
|---|---|---|---|---|---|---|---|---|---|
| Step 1 | | | | | | | | | |
| XNBR | 100 | 100 | 100 | 100 | 100 | 100 | 100 | 100 | 100 |
| Carbon Black (type N660) | 50 | 50 | 50 | 50 | 50 | 50 | 50 | 50 | 50 |
| Dioctyl phthalate | 5 | 5 | 5 | 5 | 5 | 5 | 5 | 5 | 5 |
| Sodium stearate | 0 | 1 | 2 | 3 | 4 | 5 | 7 | 10 | 15 |
| Step 2 | | | | | | | | | |
| Zinc oxide | 5 | 5 | 5 | 5 | 5 | 5 | 5 | 5 | 5 |
| Scorch (minutes) | 15 | 18.5 | 23 | 29 | 36 | 39 | 52 | 65.5 | 50.5 |

EXAMPLE 8

This example illustrates the present invention using magnesium and calcium oxide as the metal oxide in the compounds. The ingredients shown in Table 10 were mixed with heat treatment as in Example 5. Runs 1 and 3 are comparative. Each run used 5 parts by weight of pure oxide.

TABLE 10

| Ingredients (parts by weight) | Run 1 | Run 2 | Run 3 | Run 4 |
|---|---|---|---|---|
| Step 1 | | | | |
| XNBR | 100 | 100 | 100 | 100 |
| Carbon Black (type N660) | 50 | 50 | 50 | 50 |
| Dioctyl phthalate | 5 | 5 | 5 | 5 |
| Sodium Stearate | — | 3 | — | 3 |
| Step 2 | | | | |
| Magnesium oxide (sold under trade name MAGLITE ® D by C P. Hall, 92.3% by wt. pure) | 5.42 | 5.42 | — | — |
| Calcium oxide (sold under trade name DesiCal ® P by Harwick, 80% by wt. paste dispersion in high flash rubber process oil) | — | — | 6.25 | 6.25 |
| Scorch (minutes) | 12 | 14.5 | 10 | 38 |

EXAMPLE 9

This example compares the scorch of a number of compounds produced by admixing the ingredients shown in Table 11. A three-step procedure similar to Example 3 was used and scorch was measured after Step 2 and again after Step 3. In this example, Step 1 was performed as a series of mixing steps wherein at the start, all of the XNBR, one-third of the carbon black and all of the alkali metal salt were added to the Brabender with head temperature at about 80° C. Mixing was initiated and continued for 1 minute and then a further one-third of the carbon black and one-half of the dioctyl phthalate were added. Mixing was continued for a further 1.5 minutes and then the remaining one-third of the carbon black and one-half of the dioctyl phthalate were added. Mixing was continued for a further 2.5 minutes and the maximum chamber temperature is shown in the table. The resulting mixture was transferred to a cool rubber mill and Steps 2 and 3 were carried out as in Example 3. Runs 1 through 5 illustrate the present invention while Run 6 is comparative.

EXAMPLE 10

This example illustrates that the vulcanizable polymer compositions of the present invention may be heated to form vulcanizates with very good physical properties. The ingredients shown in Table 12 were mixed in two steps as shown. Step 1 was carried out in a Banbury mixer while step 2 was carried out on a cool rubber mill as described in previous examples. Scorch and Mooney viscosity were determined for the compounds. The compounds were then vulcanized by heating at 165° C. for the length of time shown in the Table to provide the same state of cure in each as measured by the $t_{90}$. (Physical properties of the vulcanizates were determined according to conventional methods well known in the art. For the determination of hardness and abrasion, the compositions were heated for an additional 5 minutes over the $t_{90}$ time, and for compression set an additional 15 minutes over the $t_{90}$. Runs 1 to 4 are comparative while Runs 5 to 10 illustrate the present invention.

TABLE 11

| Ingredients (pt. 2.33 weight) | Run 1 | 2 | 3 | 4 | 5 | 6 |
|---|---|---|---|---|---|---|
| Step 1 | | | | | | |
| XNBR | 100 | 100 | 100 | 100 | 100 | 100 |
| Carbon Black (type N660) | 50 | 50 | 50 | 50 | 50 | 50 |
| Dioctyl phthalate | 5 | 5 | 5 | 5 | 5 | 5 |
| Lithium stearate | 2.33 | — | — | — | — | — |
| Potassium stearate | — | 3.15 | — | — | — | — |
| Potassium palmitate | — | — | 2.88 | — | — | — |
| Potassium laurate | — | — | — | 2.33 | — | — |
| Sodium stearate | — | — | — | — | 3.00 | — |
| Maximum Chamber Temperature (°C.) | 142 | 142 | 140 | 139 | 142 | 142 |
| Step 2 | | | | | | |
| Zinc oxide | 5 | 5 | 5 | 5 | 5 | 5 |
| Scorch (minutes) | 19 | 31 | 21 | 19 | 40 | 19 |
| Step 3 | | | | | | |
| Sulfur | 1.5 | 1.5 | 1.5 | 1.5 | 1.5 | 1.5 |
| Tetramethyl thiuram monosulfide | 1.5 | 1.5 | 1.5 | 1.5 | 1.5 | 1.5 |
| Scorch (minutes) | 14.5 | 13 | 8 | 13.5 | 21 | 9 |

TABLE 12

| Ingredients (parts by weight) | Run 1 | 2 | 3 | 4 | 5 | 6 | 7 | 8 | 9 | 10 |
|---|---|---|---|---|---|---|---|---|---|---|
| Step 1 | | | | | | | | | | |
| XNBR | 95 | 100 | 100 | 100 | 100 | 100 | 100 | 100 | 100 | 100 |
| Carbon Black (type N660) | 50 | 50 | 50 | 50 | 50 | 50 | 50 | 50 | 50 | 50 |
| Dioctyl phthalate | 5 | 5 | 5 | 5 | 5 | 5 | 5 | 5 | 5 | 5 |
| Sulfur | 1.5 | 1.5 | 1.5 | 1.5 | 1.5 | 1.5 | 1.5 | 1.5 | 1.5 | 1.5 |
| Stearic acid | 1 | 1 | 1 | 1 | 1 | 1 | 1 | 1 | 1 | 1 |
| Potassium stearate | — | — | — | — | — | 3 | 3 | 2 | 1 | 3 |
| Sodium stearate | — | — | — | — | 3 | — | — | — | — | — |
| Calcium stearate | — | 3 | — | — | — | — | — | — | — | 3 |
| Zinc stearate | — | — | 3 | — | — | — | — | — | — | — |
| Step 2 | | | | | | | | | | |
| Tetramethyl thiuram monosulfide | 1.5 | 1.5 | 1.5 | 1.5 | 1.5 | 1.5 | 1.5 | 1.5 | 1.5 | 1.5 |
| Zinc ozide | — | 5 | 5 | 5 | 3 | 5 | 3 | 3 | 3 | 3 |
| KRYNAC PA50 | 10 | — | — | — | — | — | — | — | — | — |
| Compound Properties | | | | | | | | | | |
| Scorch (minutes) | 13 | 7 | 4 | 5 | 14 | 12 | 14 | 10 | 8 | 12 |
| Mooney viscosity (ML 1 + 4 at 100° C.) | 67.5 | 73.0 | 91.0 | 78.0 | 63.5 | 72.5 | 62.0 | 67.0 | 62.0 | 70.0 |
| Vulcanization Time (minutes) | 9 | 10 | 11 | 6 | 10 | 8 | 16 | 11 | 8 | 13 |
| Vulcanizate Properties | | | | | | | | | | |
| Tensile strength (MPa) | 23.4 | 23.8 | 25.0 | 25.0 | 24.0 | 25.2 | 24.0 | 24.1 | 23.5 | 25.7 |
| Elongation (%) | 310 | 250 | 270 | 280 | 350 | 300 | 340 | 340 | 360 | 340 |
| 100% modulus (MPa) | 7.4 | 11.8 | 10.2 | 10.5 | 7.6 | 9.8 | 7.5 | 7.8 | 7.1 | 8.0 |
| 300% modulus (MPa) | 23.1 | — | — | | 21.3 | 25.2 | 21.7 | 21.9 | 21.0 | 23.3 |
| Tear Die C (kN/m) | 55.9 | 60.8 | 62.7 | 61.7 | 54 | 60.8 | 53 | 51 | 53 | 53 |
| Hardness Shore A-2 | 81 | 80 | 78 | 84 | 77 | 83 | 79 | 79 | 76 | 81 |
| Abrasion, DIN (mm³) | 121.7 | 126.9 | 132.0 | 123.5 | 96 | 127.5 | 100 | 100 | 98 | 101 |
| Abrasion, NBS (%) | 854 | 1029 | 1023 | 1125 | 1257 | 939 | 1062 | 1162 | 1131 | 1357 |
| Compression set (%) | 27.4 | 21.7 | 19.6 | 30.2 | 18.3 | 19.5 | 17.6 | 17.3 | 19.3 | 21.7 |

EXAMPLE 11

A carboxylated styrene-butadiene rubber, prepared by the well known emulsion free radical polymerization process, was used in this example. The styrene and carboxylic acid content of said rubber were about 20 weight percent and 5 weight percent respectively (with butadiene forming the balance).

Compounds were produced by mixing the ingredients shown in Table 13. The mixing was performed in a series of steps. At the start of the mixing, all of the carboxylated SBR, one third of the carbon black and all of the alkali metal salt were added to the Brabender mixer. Mixing was initiated and continued for one minute and then a further one third of the carbon black and one half of the oil were added. Mixing was continued for a further 1.5 minutes and then the remaining carbon black and oil were added. Mixing was continued for a further 2.5 minutes. The resulting mixture was then transferred to a cool rubber mill and mixed with sulfur, tetramethyl thiuram monosulfide and zinc oxide until homogeneous.

Mooney scorch values were determined according to ASTM D1646 at an operating temperature of 125° C. The times required for a 5 point rise in Mooney viscosity, usually called the $t_5$ time, are reported.

The compounds were vulcanized for the times shown in Table 13 and physical properties of the vulcanizates were determined according to conventional methods well known in the art. Runs 1 to 3 illustrate the present invention while Run 4 is comparative.

TABLE 13

| Run | 1 | 2 | 3 | 4 |
|---|---|---|---|---|
| Ingredients | | | | |
| Carboxylated SBR | 100 | 100 | 100 | 100 |
| N660 black | 50 | 50 | 50 | 50 |
| Sodium stearate | 3 | 5 | 5 | — |
| Sunthene ® 422 oil | 5 | 5 | 5 | 5 |
| Zinc oxide | 5 | 3 | 5 | 5 |
| Sulfur | 1.0 | 1.0 | 1.0 | 1.0 |
| Tetramethyl thiuram monosulfide | 1.5 | 1.5 | 1.5 | 1.5 |
| Compound Properties | | | | |
| Mooney scorch (min) | 11.0 | 25.3 | 16.0 | 3.7 |
| Vulcanization time (min) | 9.5 | 27 | 12 | 13 |
| Tensile Strength (MPa) | 22.4 | 20.8 | 21.8 | 21.4 |
| Elongation (%) | 370 | 460 | 380 | 380 |
| 100% Modulus (MPa) | 5.9 | 3.5 | 5.2 | 5.0 |
| 300% Modulus (MPa) | 19.1 | 13.7 | 17.9 | 18.0 |
| Shore A Hardness | 85 | 81 | 87 | 84 |

What is claimed is:

1. A vulcanizable polymer composition with improved scorch comprising (1) a carboxylated styrene-butadiene rubber, said rubber being a copolymer of butadiene, styrene, and one or more $\alpha$-$\beta$ unsaturated carboxylic acids selected from acrylic, methacrylic, fumaric, maleic and itaconic acids, (2) one or more polyvalent metal oxides, and (3) one or more alkali metal salts selected from the lithium sodium and potassium salts of $C_{12-18}$-alkanoic acids.

2. The composition according to claim 1 wherein said polyvalent metal oxide is selected from zinc, magnesium, calcium, cadmium, barium, lead, cobalt, tin and strontium oxides, and mixtures thereof.

3. The composition according to claim 1 wherein said polyvalent metal oxide is selected from zinc, magnesium, calcium and barium oxides, and mixtures thereof, and wherein said composition further comprises elemental sulfur and one or more sulfur accelerators.

4. The composition according to claim 1 wherein the amount of said alkali metal salt in said composition is from about 0.5 to about 25 parts by weight per 100 parts by weight of said rubber.

5. The composition according to claim 2 wherein said alkali metal salt is selected from sodium and potassium stearate and wherein the amount of said salt in said composition is from about 0.5 to about 10 parts by weight per 100 parts by weight of said rubber.

6. The composition according to claim 5 wherein the polyvalent metal oxide is zinc oxide and wherein the amount of said salt in said composition is from about 2 to about 5 parts by weight per 100 parts by weight of said rubber.

7. The composition according to claim 3 wherein said alkali metal salt is selected from sodium and potassium stearate and wherein the amount of said salt in said composition is from about 0.5 to about 10 parts by weight per 100 parts by weight of said rubber.

8. The composition according to claim 7 wherein the polyvalent metal oxide is zinc oxide and wherein the amount of said salt in said composition is from about 2 to about 5 parts by weight per 100 parts by weight of said rubber.

9. A method for preparing a vulcanizable polymer composition with improved scorch comprising mixing (1) a carboxylated styrene-butadiene rubber, said rubber being a copolymer of butadiene, styrene, and one or more $\alpha$-$\beta$ unsaturated carboxylic acids selected from acrylic, methacrylic, fumaric, maleic and itaconic acids, with (2) one or more alkali metal salts selected from the lithium sodium and potassium salts of $C_{12-18}$-alkanoic acids and with (3) one or more polyvalent metal oxides.

10. The method according to claim 9 wherein said polyvalent metal oxide is selected from zinc, magnesium, calcium and barium oxides and mixtures thereof and wherein said method further comprises mixing elemental sulfur and one or more sulfur accelerators.

11. The method according to claim 9 wherein the amount of said alkali metal salt is from about 0.5 to about 25 parts by weight per 100 parts by weight of said rubber.

12. The method according to claim 9 wherein said carboxylated styrene-butadiene rubber and said alkali metal salt are mixed in a first step and the mixture resulting therefrom is mixed with said metal oxide in a second step.

13. The method according to claim 12 wherein the mixture resulting from said first step is heat treated at a temperature of from about 85° to about 175° C. while being mixed and the mixture resulting from the heat treatment is then mixed with said metal oxide.

14. The method according to claim 13 wherein the polyvalent metal oxide is zinc oxide, said alkali metal salt is selected from sodium and potassium stearate and the amount of said salt is from about 2 to about 5 parts by weight per 100 parts by weight of said rubber, and wherein said temperature is from about 100° to about 160° C.

15. The method according to claim 10 wherein said carboxylated styrene-butadiene rubber and said alkali metal salt are mixed in a first step, the mixture resulting therefrom is heat treated at a temperature of from about 85° to about 175° C. while being mixed, the mixture resulting from the heat treatment is mixed with said metal oxide in a second step, and said sulfur and said sulfur accelerator are mixed in one of said second step or a subsequent third step.

16. The vulcanizate formed by heating the compositions of claim 1.

* * * * *